US012776647B2

(12) United States Patent
Pfeilschifter et al.

(10) Patent No.: US 12,776,647 B2
(45) Date of Patent: Oct. 27, 2026

(54) CAPACITIVE FUNCTIONALITY TEST FOR VARISTORS OF A HIGH-VOLTAGE PROTECTIVE DEVICE FOR AN ON-BOARD VEHICLE ELECTRICAL SYSTEM

(71) Applicant: Vitesco Technologies GmbH, Regensburg (DE)

(72) Inventors: Franz Pfeilschifter, Walderbach (DE); Martin Götzenberger, Ingolstadt (DE)

(73) Assignee: Vitesco Technologies GmbH, Regensburg (DE)

( * ) Notice: Subject to any disclaimer, the term of this patent is extended or adjusted under 35 U.S.C. 154(b) by 192 days.

(21) Appl. No.: 18/739,503

(22) Filed: Jun. 11, 2024

(65) Prior Publication Data

US 2024/0332956 A1 Oct. 3, 2024

Related U.S. Application Data

(63) Continuation of application No. PCT/EP2022/084048, filed on Dec. 1, 2022.

(30) Foreign Application Priority Data

Dec. 14, 2021 (DE) ..................... 10 2021 214 316.4

(51) Int. Cl.
*H02H 9/04* (2006.01)
*B60L 3/00* (2019.01)

(52) U.S. Cl.
CPC ........... *H02H 9/042* (2013.01); *B60L 3/0023* (2013.01); *H02H 9/044* (2013.01)

(58) Field of Classification Search
CPC ...... H02H 9/042; H02H 9/044; B60L 3/0023; G01R 27/2605; G01R 31/2637; G01R 31/006; G01R 27/02; G01R 27/2611
(Continued)

(56) References Cited

U.S. PATENT DOCUMENTS

2011/0267730 A1* 11/2011 Brand ...................... H02H 9/04 361/91.5
2016/0156179 A1* 6/2016 Walter ................... H02H 3/202 361/91.1
2021/0124078 A1 4/2021 Widmer

FOREIGN PATENT DOCUMENTS

DE 19852775 A1 6/1999
DE 202019005383 U1 7/2020
(Continued)

OTHER PUBLICATIONS

Dongxiang Zhou et al; Degradation phenomena due to dc bias in low-voltage ZnO varistors; Degradation phenomena due to dc bias in low-voltage ZnO varistors; Published 2002 by Elsevier Science B.V.pp. 412-415; Shanghai CN.
(Continued)

*Primary Examiner* — Sreeya Sreevatsa

(57) ABSTRACT

A method for checking the functionality of a high-voltage protective device for an on-board vehicle electrical system is provided. The protective device has a varistor or a different voltage limiting element. The method provides that the capacitive component of the alternating current impedance of the varistor or the voltage limiting element is detected. The capacitive component is further compared to a rated capacitance value, where the rated capacitance value is characteristic of the capacitance of a functioning varistor or voltage limiting element. A defective state of the varistor or the voltage limiting element is determined when the comparison determines that the capacitive component deviates from the rated capacitance value by more than a predetermined magnitude. Furthermore, a high-voltage protection circuit for a vehicle and a high-voltage on-board vehicle electrical system is provided.

10 Claims, 1 Drawing Sheet

FB

(58) Field of Classification Search
USPC .......................................................... 361/118
See application file for complete search history.

(56) References Cited

FOREIGN PATENT DOCUMENTS

| | | | | |
|---|---|---|---|---|
| DE | 102019209588 B3 | | 9/2020 | |
| DE | 102021100497 A1 | | 7/2021 | |
| DE | 102020207878 B3 | | 8/2021 | |
| EP | 0576395 A1 | * | 12/1993 | ............. H02H 3/025 |
| JP | 6070470 B2 | * | 2/2017 | |
| JP | 2020174523 A | | 10/2020 | |
| WO | 2010079132 A2 | | 7/2010 | |

OTHER PUBLICATIONS

European Search Report dated Mar. 28, 2022 for corresponding European Patent Application No. PCT/EP2022/084048.
German Search Report dated Oct. 13, 2022 for corresponding German Application No. 10 2021 214 316.4.
Source: Office action Corresponding to Korean Patent Application No. 10-2024-7023557, dated Oct. 9, 2025.

* cited by examiner

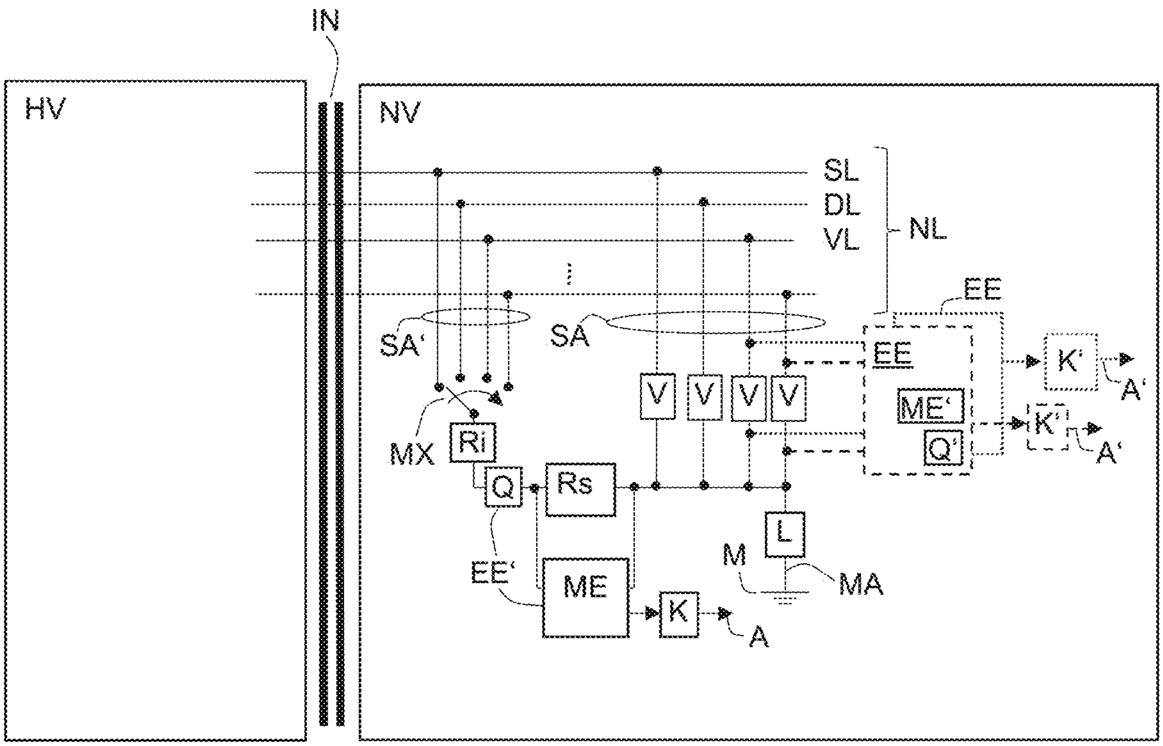
FB

CAPACITIVE FUNCTIONALITY TEST FOR VARISTORS OF A HIGH-VOLTAGE PROTECTIVE DEVICE FOR AN ON-BOARD VEHICLE ELECTRICAL SYSTEM

CROSS-REFERENCE TO RELATED APPLICATIONS

This application claims the benefit of PCT Application PCT/EP2022/084048, filed Dec. 1, 2022, which claims priority to German Application 10 2021 214 316.4, filed Dec. 14, 2021. The disclosures of the above applications are incorporated herein by reference.

TECHNICAL FIELD

The disclosure relates to a capacitive functionality test for varistors of a high-voltage protective device for an on-board vehicle electrical system.

BACKGROUND

It is known practice to equip vehicles with electric drives which are supplied by batteries. Here, in addition to DC-to-DC voltage converters, inverters are also provided and also charging circuits which are connected inside the on-board vehicle electrical system to the drive and the battery. On the one hand, to reach high powers it is necessary that these components are high-voltage components and therefore operate with a nominal voltage of more than 60 V, for example of 400 or 800 V. This necessitates elevated safety measures which are, for example, yielded by high-voltage isolation and in particular by the provision of a high-voltage on-board electrical system which is galvanically isolated from low-voltage sections of the on-board electrical system. On the other hand, it is necessary that these high-voltage components are monitored or controlled, for which low-voltage signals are used. These low-voltage signals are exchanged via lines which extend out of the high-voltage on-board electrical system branch into the low-voltage section.

Therefore, there is a need to provide options that allow these low-voltage lines to be safe with regard to dangerous high-voltage potentials.

SUMMARY

The disclosure provides a high-voltage protective device for an on-board vehicle electrical system, which protects against high-voltage potentials by way of varistors or other voltage limiting elements. For one thing, this may take place in that the varistors (or the other voltage limiting elements) themselves discharge dangerous high-voltage potentials to a reference potential and/or in that a current flow is provided by way of the varistors (or other voltage limiting elements), which current flow is caused by dangerous high-voltage potentials (on a low-voltage line) so that this current flow can be safely detected by further measures, for example by insulation monitors. Here, the varistors (or the other voltage limiting elements) are used for protection in that the same begin to conduct if a high-voltage potential appears at a point in the on-board electrical system at which this would not occur in the fault-free state.

The varistors and the other voltage limiting elements have the property, as a component, of conducting if a voltage applied across the relevant component is above a limit voltage (or breakdown voltage) and otherwise not conducting. This limit voltage is for example more than 20 V or 40 V. Furthermore, these components have the property, in the defective state, for example after overloading or after exceeding an aging limit, of having different capacitive properties than in the fault-free state (in which the rated capacitance value is present for example). These components can be provided by a varistor (as mentioned) or can be provided by a voltage limiting element, such as a gas discharge tube, a spark gap, a protective diode, a thyristor circuit, a DIAC, a Zener diode and/or a four-layer diode. In the following, properties, features and implementations are described, which apply both for the varistor mentioned there and for the other voltage limiting elements. In particular, the term “varistor” is used to represent: a varistor (component), a gas discharge tube, a spark gap, a protective diode, a thyristor circuit, a DIAC, a Zener diode and/or a four-layer diode or else other components having the properties mentioned in the introduction.

The function of the varistors, is checked according to the disclosure. This is carried out in that the capacitance of the varistors and the varistor is determined, as it is possible to determine on the basis of the capacitance whether the varistor is in a defective or in a fault-free state. The capacitance in the fault-free state is for example known from data sheets of the varistor and therefore a known property of the varistor. If a varistor is fed at a high voltage at which the varistor conducts, then the varistor may for example suffer damage due to too high a flow current (i.e. greater than the maximum current according to the design) which leads to this varistor no longer operating correctly. Using voltages below the threshold voltage of the varistor, this cannot be reliably checked, as at voltages which are too low (below the threshold value) the varistor does not conduct and in the defective state of the varistor likewise has too high a resistance (independently of the applied voltage). A check by way of high voltages (above the threshold voltage) hides the risk of a dangerous contact voltage.

The capacity check proposed determines the functionality of the varistor without a high test voltage above the threshold value having to be applied, in order to check the conduction which then begins (in the fault-free state).

Therefore, a method is described for checking the functionality of a high-voltage protective device for an on-board vehicle electrical system (for short: protection circuit), which high-voltage protective device has a varistor. Here, the capacitance of the varistor is determined. Based on the determined capacitance, it is possible to deduce whether the varistor is functioning or not or whether this varistor is in a defective or in a fault-free state. Thus, the capacitive component of the alternating current impedance of the varistor is detected. After this has been detected, for example by active measurement, this detected capacitive component is evaluated and compared with a rated capacitance value. Here, the difference may be formed between the detected capacitive component and the rated capacitance value (which is provided in the fault-free state of the varistor) or the capacitive component is compared with a capacitance interval which is characteristic of a range which the varistor has in the fault-free state (for example taking account of the manufacturing tolerance). The rated capacitance value is characteristic of the capacitance of a functioning varistor, i.e. a varistor in fault-free state; a corresponding interval would be characteristic of the capacitance or the capacitance range of a functioning varistor.

The defective state of the varistor is determined if the comparison determines that the capacitive component deviates from the rated capacitance value by more than a predetermined magnitude. This rated value can for example also be given by the limits of a capacitance interval which is characteristic of the capacitance of a functioning varistor. In this case, the comparison with the limits corresponds to a comparison of the detected capacitive component with the interval which is defined by the limits. In the following, a comparison with a rated capacitance value is discussed in a simplified manner, where this may relate to the comparison with a single value or else the comparison with limits of an interval which represents a functioning varistor or with values inside this interval.

The predetermined magnitude reflects how much the component of the rated capacitance value can still deviate from the rated capacitance value, in order nevertheless to achieve a fault-free state or reproduces the limit which, when exceeded, leads to a defective varistor being assumed. The magnitude is also used for taking account of detection errors or measurement errors and of manufacturing tolerances of the varistor in order to avoid the not incorrect assumption that a varistor is defective owing to conventional measurement or detection errors or in the case of a normal spread of the rated capacitance value.

The detection can be carried out by an active measuring process in which an alternating current signal is applied to the varistor and in which the AC voltage signal, which is generated thereby at the varistor, is detected. The capacitance, i.e. the capacitive component, results due to the relationship of the applied alternating current signal to the AC voltage signal in the known manner. Also, a complementary measurement to this is possible, in which an AC voltage signal is applied to the varistor and the associated alternating current signal that is applied at the varistor is detected. When an alternating current signal is applied, the AC voltage that is applied directly at the varistor can be determined or a voltage can be determined, which varies with the voltage that is applied at the varistor or depends on the voltage applied at the varistor, in order to form the AC voltage signal therefrom. When an AC voltage signal is applied at the varistor, the alternating current signal can be detected in that the current flowing through the varistor itself is detected or in that the current is determined with the aid of a shunt resistor for measuring the current in that the voltage applied at the shunt is determined, which voltage corresponds to the alternating current. Both the AC voltage signal and the alternating current signal can be direct measurement signals or signals may be derived therefrom, particularly using amplifiers, voltage dividers, shunt resistors or the like.

As mentioned, the capacitive component can be measured actively, i.e. application of an excitation signal (application of an alternating current signal or an AC voltage signal) and by detecting an AC voltage signal or alternating current signal resulting therefrom, which reflects the reaction to the excitation signal. In the case of a plurality of varistors, each varistor can be provided with its own device for active detection or one and the same detection device can be used by way of multiplexing, where this common device is connected to the various varistors alternately or successively in order to return the capacitive components thereof. The capacitive components of the varistors can therefore be detected using individual devices (for example one per varistor). Each varistor or a subgroup thereof can be provided with its own signal source (current or voltage source for the AC voltage signal or alternating current signal that is to be applied). Alternatively or in combination with this, each varistor or a subgroup thereof can be provided with its own measuring device which detects the resulting signal (AC voltage signal when an alternating current is applied and alternating current signal when an AC voltage is applied). Therefore, there is a separate measuring device for each varistor or for a subgroup thereof, which measuring device detects the resulting signal which exists at the associated varistor.

An option is described below, in which the capacitive components of a plurality of varistors are detected by signal multiplexing. Here, the capacitive component of a plurality or all varistors is detected using the same device, particularly successively using signal multiplexing. It can be provided that the same signal source applies an alternating current signal to all varistors or to a subgroup thereof. This can take place by a multiplexing device, i.e. successively or the alternating current signal (or the AC voltage signal) can be applied to all varistors or to a subgroup thereof simultaneously. Alternatively or in combination with this, the same measuring device can detect the resulting signal at the varistors for all varistors or for a subgroup thereof, i.e. at all varistors or a subgroup thereof, particularly successively. When detecting the resulting signals of the varistors successively, signal multiplexing may also be used during measurement. In addition, the same device can detect the resulting signal at all varistors or a subgroup thereof simultaneously (without signal multiplexing), as a sharply increased capacitive component can be detected thereby even in the case of a plurality of varistors, in order thus to determine that at least one of the varistors is defective. As a result, no signal multiplexing would be necessary. Using signal multiplexing, particularly during measurement, gives the advantage that it is not only detected that at least one of the varistors is defective but also that it is also possible to detect which varistor is defective. The detection would therefore be varistor-specific and not specific to a subgroup or to all varistors.

In some implementations, the method is carried out on a varistor via which the potential of a low-voltage line is connected to an on-board vehicle electrical system ground. This low-voltage line is led out of the high-voltage zone and, in the event of faults in the isolation inside the high-voltage zone, can thus carry too high a voltage (with respect to ground) so the varistor is triggered (i.e. becomes partially or completely conductive). This relates to the varistor or all varistors for which a capacitive component is detected. For example, this relates to the varistors for which the detected capacitive component is compared with a rated capacitive value. In other words, the varistor for which the state is determined may be connected to a reference potential such as the on-board vehicle electrical system ground. This connection may be indirect, i.e. is routed via at least one impedance which is inductive and/or has an ohmic component. Therefore, the method can be carried out on a varistor which is connected via an inductance and/or via a resistor to the reference potential (on-board vehicle electrical system ground for example). Particularly in the case of connecting the varistor, at which the method is carried out, via a circuit or an impedance which has an inductive component, a low-pass filter toward the on-board vehicle electrical system ground is created as seen from the varistor.

In some implementations, the varistor(s) is connected to the reference potential via a low-pass filter or via a filter having attenuation that increases with frequency, high-cut filter. As a result, the (active) detection of the capacitive component of the alternating current impedance of the varistor with separation of the reference potential from this detection can be carried out in that the inductance blocks the alternating components with respect to the reference potential, which are caused by the active detection. In other words, the capacitive component of the alternating current impedance of the varistor is (actively) detected by a circuit, between which circuit and the on-board vehicle electrical system ground, an impedance is present, which is connected in series thereto and which attenuates AC voltage or alternating current signals toward the on-board vehicle electrical system ground. When detecting the capacitive component, an alternating signal may be used, the frequency of which is configured in such a manner that the aforementioned impedance generates a frequency-dependent attenuation of at least 10, 30 or 50 dB at this frequency. The impedance is also designed accordingly (in relation to the frequency of the alternating signal used). The frequency can be more than 1 kHz, 10 kHz, such as at least 100 kHz, 1 MHz or 5 MHz.

Below, a high-voltage protection circuit for a vehicle is described, which is suitable for carrying out the method described. The high-voltage protection circuit for a vehicle (for short: protection circuit) includes at least one protective connector which is set up for connection to a low-voltage line which is led out of a high-voltage zone. The protection circuit further includes at least one varistor. The protective connector is connected to a ground connector of the high-voltage protection circuit for a vehicle via this varistor. Here, a reference potential which is to be assigned to the vehicle chassis is generally termed a ground connector. This is also true for the on-board vehicle electrical system ground. The ground connector. mentioned here is the on-board vehicle electrical system ground or, generally, a reference potential specific to the on-board electrical system.

The protection circuit additionally has a detection device. This is connected to the varistor in a signal-transmitting manner. A direct line-specific connection or else connections via filters, capacitive couplings and/or voltage dividers or amplifiers can be termed a signal-transmitting connection. The detection device is set up to detect the capacitive component of the alternating current impedance of the varistor, particularly on the basis of the signal-transmitting connection to the varistor. Furthermore, the protection circuit has an evaluating device. This is connected downstream of the detection device. The evaluating device is set up to compare the capacitive component, which is detected by the detection device, to a rated capacitive value of the varistor. Furthermore, this evaluating device is set up to output a fault signal at a signal output of the evaluating device in the event of a deviation which exceeds a predetermined magnitude. This identifies the varistor as defective. The detection device is therefore designed for carrying out the step of detecting the capacitive component, which is described here. Generally, the evaluating device is set up to compare the capacitive component that is detected by the detection device, as described.

Here, this does not necessarily have to be connected downstream of the detection device, rather may also be part of this detection device and for example be connected downstream of an entity which is set up to detect the capacitive component of the alternating current impedance of the varistor, for example a measuring device.

In some examples, the detection device includes both at least one measuring device and an alternating signal source and additionally a comparator which carries out the step of comparison and which can correspondingly output the signal which is characteristic of a defective state.

Also in the case of the protection circuit, an alternating current source or an AC voltage source can be used, as is described previously with reference to the method. If the protection circuit includes an alternating current source, then this source is connected to the at least one varistor (in a signal-transmitting manner) and set up to impress an alternating current at the varistor. Therefore, the alternating current is used for excitation. The detection device or a measuring device thereof is connected to the varistor in a signal-transmitting manner and is set up to detect the voltage that results due to the impressed alternating current at the varistor (as a reaction). Here, the alternating current source can be part of the detection device or an alternating current source is outside of the detection device (which has a measuring device and possibly a comparison device).

Alternatively, an AC voltage source can be used for excitation, that is to say for active measurement. This is connected to the at least one varistor in a signal-transmitting manner. Furthermore, the AC voltage source is set up to apply an AC voltage to the varistor which is connected to the source directly or indirectly via a capacitive coupling, a resistor network and/or via an amplifier. The detection device is likewise connected to the varistor (in a signal-transmitting manner). The detection device is set up to detect the current which results due to the applied AC voltage at the varistor. The AC voltage source can be part of the detection device (which further can include a measuring device and/or a comparison device, such as a comparator). Alternatively, the AC voltage source is provided externally from the detection device.

In some implementations, the (active) detection of the capacitive component of the varistor provides that the same is excited by way of an alternating signal which originates from a communication unit which is connected to the low-voltage line, to which the varistor is also connected. Here, a communication signal (sensor signal, control signal, etc.) is used, for example, for exciting the varistor, where the communication signal is transmitted during the carrying out of a sensor evaluation method, an open-loop or closed-loop control method or a method for supplying low-voltage components with low voltage. The signal source for the alternating signal (that is to say the alternating current source or the AC voltage source) would in this case then not be a dedicated signal source, but rather would be a control unit, sensor unit or the like, which fulfills a further function and is connected to the low-voltage line, at which the varistor is also connected. Therefore, the terms alternating current source and alternating current source should designate both dedicated alternating signal sources and alternating signal sources which have a further function and in the context of this function generate an alternating signal, for example a data signal, communication signal, control signal, sensor signal or the like. Also, a low-voltage power supply circuit, which is transmitted via the low-voltage line, can provide this alternating signal for detecting the capacitive component, particularly if this alternating signal is used in the high-voltage zone for power supply, for example of a low-voltage component.

To realize the protection circuit or to carry out the method described here, it would therefore only be necessary in this case that a passive detection device—that is to say a detection device which does not have its own signal source, but which has a measuring unit and/or an evaluation unit—be added to an existing device.

The protection circuit may include a plurality of varistors. Here, one detection device can be provided for each varistor or for a subgroup thereof. This is connected to the respective varistor in a signal-transmitting manner. This can also be provided only for one measuring device of the detection device or for a measuring device which is assigned to the detection device. In this case, there is a fixed association between varistor and detection device. Alternatively, a selection switch can be provided, by way of which the detection device (or the measuring device thereof) is connected to all varistors or a subgroup thereof. Here, the selection switch is set up to connect the detection device to a selected varistor or to a selected subgroup of varistors. The selection switch is therefore set up to select, among the varistors or from the subgroups, one element (varistor or subgroup) from a plurality in order to connect this element to the detection device. The detection device is then able to determine the respective capacitive components of the various varistors or the various subgroups of the varistors successively. The signal multiplexing is carried out by way of the selection switch. In particular, the selection switch is set up to connect the alternating current or AC voltage signal source to different varistors or different subgroups successively. A common signal source can also be provided, which applies the alternating signal (alternating current or AC voltage) to all varistors or to all subgroups, while only the detection device can select the individual varistors or subgroups by way of the selection switch.

The at least one varistor may be connected via a high-pass filter to the ground connector. This avoids the alternating signal (alternating current or AC voltage), which is provided for active measurement, being discharged toward the ground connector or penetrating via the ground connector into further components of the on-board vehicle electrical system. In some examples, the at least one varistor is connected via an inductance and/or via a resistor to the ground connector. Also, the use of a resistor provides attenuation of alternating current or AC voltage components during the transmission to the ground connector.

As mentioned, the method described here and the devices described here are used for protecting at least one low-voltage line which is led out of a high-voltage zone. Here, the high-voltage zone is provided in a closed housing. Low-voltage lines are led out of this housing, for example for controlling or for censoring or else for supplying (low voltage) components inside the high-voltage zone. For example, the at least one low-voltage line passes through the housing wall which spatially closes off the high-voltage zone. In other words, the at least one low-voltage line passes through the boundary, by way of which the high-voltage zone is spatially delimited, particularly with respect to the low-voltage zone or the surroundings of the high-voltage zone. In some implementations, the at least one low-voltage line passes through insulation which separates the high-voltage section from the low-voltage section.

In the following, this is described in more detail by way of example with reference to a high-voltage on-board vehicle electrical system.

A high-voltage on-board vehicle electrical system having a spatially delimited high-voltage zone is provided, out of which at least one low-voltage line is led. The at least one low-voltage line passes through the spatial boundary of the high-voltage zone here. This boundary isolates the high-voltage zone from the surroundings, particularly from a low-voltage zone. Here, the low-voltage line can lead from the high-voltage zone into the low-voltage zone. If a high-voltage protection circuit, as is described here, is provided, then the at least one protective connector of this protection circuit is connected to the at least one low-voltage line. If a plurality of low-voltage lines are provided, then the protection circuit may have at least the same number of protective connectors, so that one individual protective connector is provided for each low-voltage line.

The high-voltage zone is isolated from the low-voltage zone by way of insulation. In other words, the at least one low-voltage line is led out of the high-voltage zone through this insulation. The insulation can be provided by the spatial boundary of the high-voltage zone or by a housing or by an enclosure of the high-voltage zone. The aforementioned protection circuit is located in the low-voltage zone. The low-voltage zone has a ground potential, for example the potential of the chassis, where the ground connector of the protection circuit is connected to this potential. The ground potential is provided separately from the high-voltage zone. The protective connector or the low-voltage line is connected to the ground potential galvanically. For this reason, it is possible by way of the varistor to detect an insulation fault or defective galvanic isolation between high-voltage zone and low-voltage zone on the one hand and low-voltage zone or ground potential or ground connector on the other hand.

The low-voltage line can be provided as a sensor line. In particular, the low-voltage line can lead to a sensor inside the high-voltage zone. Components of this type are designed for example as a temperature sensor, voltage sensor, current sensor, pressure sensor or the like. The low-voltage line can further be a data line, particularly a data line for communication with components inside the high-voltage zone. For example, the data line can be a control line, in order to control a component inside the high-voltage zone from the low-voltage zone. Also vice versa, the data line can be used such that a component inside the high-voltage zone controls a component inside the low-voltage zone or generally communicates with same, for example also in order to transmit sensor data. Examples for this may be the communication between a battery management system inside the high-voltage zone, which communicates with a component of the low-voltage zone.

Finally, the low-voltage line can be a low-voltage supply line which leads from a component of the high-voltage zone to the low-voltage zone, in order to be supplied with a low voltage from the low-voltage zone. Examples for this are low-voltage sources which are connected via a low-voltage line in the form of a low-voltage supply line to a sensor or a communication component inside the high-voltage zone and are set up to supply this component inside the high-voltage zone. It is common to these lines that in fault-free operation, that is to say in the case of fault-free insulation or galvanic isolation with respect to the ground potential or the ground connector, they have a voltage which is smaller than 60 V (particularly smaller than 24 V). For example, the data lines can carry voltages which vary between 0 and 5 V or between 0 and 12 V. This is also true for the supply line. In some implementations, a plurality of low-voltage lines are provided, where of these low-voltage lines at least one or more are sensor lines, one or more are data lines and/or one or more are low-voltage supply lines.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 1 shows a high-voltage on-board vehicle electrical system having a protection circuit.

Like reference symbols in the drawing indicate like elements.

DETAILED DESCRIPTION

The high-voltage on-board vehicle electrical system FB of FIG. 1 has a spatially delimited high-voltage zone HV which adjoins a low-voltage zone by way of insulation IN. There are low-voltage lines NL inside the low-voltage zone NV, which are led out of the high-voltage zone, pass through the insulation IN, particularly also a housing in which the high-voltage zone HV is located and which are led into the low-voltage zone NV. The components which are connected to one another by way of the low-voltage lines NL are not illustrated for reasons of improved clarity. However, it can generally be assumed that the illustrated low-voltage lines connect at least one component of the low-voltage zone NV to at least one component of the high-voltage zone HV.

The low-voltage lines NL are illustrated by way of example as signal line SL, data line DL and supply line VL, where the lowermost line of the lines NL can also be a communication line.

The high-voltage on-board vehicle electrical system FB of FIG. 1 is further equipped with a high-voltage protection circuit for a vehicle (for short: protection circuit). This has a plurality of protective connectors SA, SA' for connection to the low-voltage lines NL. The protective connectors are used for connecting to the individual low-voltage lines and are further used for the connection of varistors V of the protection circuit. The varistors of FIG. 1 are in each case assigned to a certain low-voltage line NL or a specific protective connector SA. On the side facing away from the protective connectors, the varistors V are connected to a ground connector MA of the protection circuit, such as via the illustrated inductance L. This prevents AC voltage or alternating current components, which are used in the measurement, from reaching the ground connector MA or the ground potential M of the low-voltage zone during the active measurement. The ground connector MA of the protection circuit is, as illustrated, connected to the ground or the ground potential M of the low-voltage zone NV. The inductance generally forms a low-pass filter and thus prevents the transition of alternating components from the protection circuit to other potentials of the low-voltage zone NV.

The protection circuit can be designed with a detection device EE' which on the one hand has an alternating current source Q and on the other hand has a shunt resistor or measurement resistor Rs. The alternating current source is connected via the measurement resistor Rs to the varistors, particularly to the side of the varistors V, which faces away from the protective connectors. A measuring device ME is provided parallel to the measurement resistor Rs. This can be provided in the illustrated example as a voltage measuring device. This measures the voltage that results if the alternating current source Q applies an alternating current signal via the measurement resistor Rs to the varistors V. The measuring device ME outputs a signal which is characteristic of the size of the capacitive component of the selected (measured) varistor V. This size is forwarded to the comparator K which is connected downstream of the measuring device ME. This comparator compares the value which corresponds to the capacitive component with a predetermined value in order thus to determine whether the capacitive component or the measured capacitance of the relevant varistor lies in a rated range or deviates by no more than a magnitude from a rated value or not. The result is output to the output A of the comparator, where the signal at output A reflects whether the relevant varistor V is to be identified as defective or not on the basis of the capacitive component which deviates too sharply.

A selection switch MX is provided for selecting the varistor V that is to be measured, which switch is connected (via a resistor RI) to the current source Q and optionally connects like source Q to one of the protective connectors SA'. To better illustrate the functionality, the protective connectors SA' are illustrated separately from the protective connectors SA. Here, the protective connectors SA are used for connecting the varistors to the low-voltage lines NL and the protective connectors SA' are used for connecting the detection device EE' (or the alternating current source Q thereof) to the individual lines NL. Furthermore, the protective connectors SA' are used for connecting the measuring unit ME or the associated measurement resistor Rs to the low-voltage lines NL (via the selection switch MX). The protective connectors SA' are therefore used for the active detection or measurement of the capacitive component of the varistors V which are in turn used for discharging current in the event of excessive voltages of the low-voltage lines NL (with respect to ground). It can be seen that the protective connectors SA' and SA are connected to the same potentials, so that in an actual example, the protective connectors SA' and SA are connected to one another inside the protection circuit in order thus to constitute a common protective connector for the low-voltage lines NL. As a result, each low-voltage line NL has to be contacted only once.

The selection switch MX is used for selecting one of the varistors V. In the illustrated example, the varistor V that is connected to the signal line SL is selected. By way of the selection switch MX, as a result, an alternating current is applied to this varistor, while it is likewise selected in the same manner by the same selection switch MX that the voltage resulting at the relevant varistor V is detected by the measuring unit ME. If the source Q is an AC voltage source, then the picture is the same: The voltage is applied, via the measurement resistor Rs on the one hand and via the selection switch MX on the other hand, to the relevant varistor which is connected to the signal line SL. By way of the measurement resistor Rs, the associated current is detected by detecting the voltage that drops at this resistor Rs. Thus, the measuring unit is also used here for detecting the current across the resistor Rs. Alternatively, the measuring unit can also detect the voltage falling at the varistor V directly (as illustrated by detection device EE). However, independently of the actual configuration and linking of the measuring unit ME, this measuring unit detects either the current flowing through the varistor by way of the measurement resistor Rs, which is used as a shunt resistor, or measures a voltage, from which the voltage falling at the varistor V can be derived.

Instead of the use of a detection device EE' for all varistors V, by using a selection switch, detection devices as illustrated with the reference sign EE can also be provided. Illustrated on the right side dashed is a first detection device EE which is connected in parallel to the varistor V that is illustrated furthest to the right. A further detection device EE, illustrated with dotted lines, is connected to a different low-voltage line NL, namely to the line VL. In other words, the various illustrated detection devices EE are connected to various varistors, in order to measure the voltage that falls across them. Each detection device EE has a measuring unit ME', using which the voltage falling at the varistor V is detected. In addition, each of the detection devices EE has a source Q', by way of which an AC voltage signal can be applied to the connected varistor V. If the source Q is an alternating current source, then the measuring unit ME' detects the voltage falling at the connected varistor V. If the source Q' is an AC voltage source, then the measuring device ME' detects the current that flows between source and connected varistor. Each detection device EE is set up to calculate the capacitive component of the connected varistor, particularly by determining the relationship of measured or impressed current to falling voltage or applied voltage. This result is, as illustrated, forwarded to respective comparators K', where the respective outputs A' thereof output a signal which identifies whether the measured capacitive component deviates from a rated component by more than a magnitude or not. If the deviation is greater than the predetermined magnitude, then a defective varistor is assumed. The outputs A' can be combined, for example by a logical OR circuit. This detects whether at least one output A' outputs a signal which characterizes a defective varistor. The OR operation can have a total output which indicates whether at least one of the individual outputs A' is characteristic of a defective varistor, in order thus, in general, to identify or output a fault in the protection circuit or a fault in the group of varistors.

A number of implementations have been described. Nevertheless, it will be understood that various modifications may be made without departing from the spirit and scope of the disclosure. Accordingly, other implementations are within the scope of the following claims.

What is claimed is:

1. A method for checking a functionality of a high-voltage protective circuit for an on-board vehicle electrical system, the high-voltage protective circuit comprises at least one protective connector that is set up for connection to a low-voltage line which is led out of a high-voltage zone, the high-voltage protective device has circuit includes a varistor or a voltage limiting element via which the at least one protective connector is connected to the ground connector, the method comprising:

- detecting, by an active measuring process in which an alternating current signal is applied to the varistor or the voltage limiting element, a capacitive component of an alternating current impedance of the varistor or the voltage limiting element;
- comparing the capacitive component to a rated capacitance value, the rated capacitance value is characteristic of the capacitance of a functioning varistor or a functioning voltage limiting element; and
- determining a defective state of the varistor or the voltage limiting element when the comparison determines that the capacitive component deviates from the rated capacitance value by more than a predetermined magnitude.

2. The method of claim 1, wherein the detection is carried out:

- by applying an alternating current signal to the varistor or to the voltage limiting element and by detecting the associated alternating current (AC) voltage signal that is applied at the varistor or at the voltage limiting element, or
- by applying an AC voltage signal to the varistor or to the voltage limiting element and by detecting the associated alternating current signal that is applied at the varistor or at the voltage limiting element.

3. The method of claim 1, further comprising:

- wherein for a plurality of varistors or voltage limiting elements, respective capacitive component of the alternating current impedance is detected; and
- wherein the capacitive components of the varistors or the voltage limiting elements are detected using individual devices and for each varistor or for each voltage limiting element or a subgroup thereof, a respective signal source applies an alternating current signal and/or for each varistor or voltage limiting element or a subgroup thereof, a respective measuring device detects a resulting signal at the associated varistor or at the voltage limiting element, or the capacitive components of the plurality of varistors or voltage limiting elements are detected by signal multiplexing using the same device and the same signal source applies an alternating current signal to all varistors or voltage limiting elements or to a subgroup thereof and/or the same measuring device detects the resulting signal at the varistors or at the voltage limiting elements for all varistors or voltage limiting elements or for a subgroup thereof.

4. The method of claim 1, wherein the method is carried out on the varistor or the voltage limiting element, via which a potential of a low-voltage line, which is led out of a high-voltage zone, is connected to an on-board vehicle electrical system ground including an inductance and/or a resistor.

5. A high-voltage protection circuit for a vehicle, the high-voltage protection circuit comprising:

- a ground connector;
- at least one protective connector that is set up for connection to a low-voltage line which is led out of a high-voltage zone;
- at least one varistor or voltage limiting element, via which the at least one protective connector is connected to the ground connector;
- a detection device configured to provide an alternating current signal which is applied to the varistor or the voltage limiting element, the detection device connected to the at least one varistor or voltage limiting element, the detection device detects a capacitive component of an alternating current impedance of the varistor or the voltage limiting element;
- an evaluating device comparing the capacitive component, which is detected by the detection device, to a rated capacitive value of the varistor, the evaluating device outputting a fault signal at a signal output of the evaluating device when a deviation which exceeds a predetermined magnitude, which fault signal identifies the varistor or the voltage limiting element as defective.

6. The high-voltage protection circuit of claim 5, further comprising:

- an alternating current source connected to the at least one varistor or voltage limiting element and set up to impress an alternating current into the varistor or into the voltage limiting element, wherein the detection device is connected to the varistor or the voltage limiting element and is set up to detect the voltage that results due to the impressed alternating current at the varistor or at the voltage limiting element, or
- an alternating current (AC) voltage source connected to the at least one varistor or voltage limiting element and is set up to apply an AC voltage at the varistor or voltage limiting element, wherein the detection device is connected to the varistor or the voltage limiting element and is set up to detect the current that results due to the applied AC voltage at the varistor or at the voltage limiting element.

7. The high-voltage protection circuit of claim 5, further comprising:

a plurality of varistors or voltage limiting elements, wherein one detection device is provided for each varistor or each voltage limiting element or a subgroup thereof, which is connected to the respective varistor or voltage limiting element, or a selection switch is provided, by way of which the detection device is connected to all varistors or voltage limiting elements or a subgroup thereof and the selection switch is set up to connect the detection device to a selected varistor or voltage limiting element or to a selected subgroup of the varistors or voltage limiting elements.

8. The high-voltage protection circuit of claim 5, wherein the at least one varistor or the at least one voltage limiting element is connected via an inductance and/or a resistor to the ground connector.

9. A high-voltage on-board vehicle electrical system having a spatially delimited high-voltage zone, out of which at least one low-voltage line is led, the high-voltage on-board vehicle electrical system comprising:

a high-voltage protection circuit comprising:

a ground connector;

at least one protective connector that is set up for connection to a low-voltage line which is led out of a high-voltage zone;

at least one varistor or voltage limiting element, via which the at least one protective connector is connected to the ground connector;

a detection device configured to provide an alternating current signal which is applied to the varistor or the voltage limiting element, the detection device connected to the at least one varistor or voltage limiting element, the detection device detects a capacitive component of an alternating current impedance of the varistor or the voltage limiting element; and an evaluating device comparing the capacitive component, which is detected by the detection device, to a rated capacitive value of the varistor, the evaluating device outputting a fault signal at a signal output of the evaluating device when a deviation which exceeds a predetermined magnitude, which fault signal identifies the varistor or the voltage limiting element as defective, wherein the protective connector of the high-voltage protection circuit for the vehicle is connected to the at least one low-voltage line, the high-voltage zone is isolated by insulation from a low-voltage zone in which the high-voltage protection circuit for a vehicle is located, and the ground connector of the high-voltage protection circuit for a vehicle is connected to a ground potential of the low-voltage zone, wherein the ground potential is galvanically isolated from the high-voltage zone.

10. The high-voltage on-board vehicle electrical system of claim 9, wherein the at least one low-voltage line is designed as a sensor line, data line or low-voltage supply line.

* * * * *